US005536782A

United States Patent [19]

Takarada et al.

[11] Patent Number: 5,536,782

[45] Date of Patent: Jul. 16, 1996

[54] BINDER FOR ELECTROPHOTOGRAPHIC TONER

[75] Inventors: Mitsuhiro Takarada; Ichiro Ono, both of Gunma-ken, Japan

[73] Assignee: Shin-Etsu Chemical Co., Ltd., Tokyo, Japan

[21] Appl. No.: 362,953

[22] Filed: Dec. 23, 1994

[30] Foreign Application Priority Data

Dec. 24, 1993 [JP] Japan .......................................... 5-347616

[51] Int. Cl.[6] ........................................................ C08F 8/00

[52] U.S. Cl. .......................... 525/100; 525/106; 525/437; 525/479; 526/279

[58] Field of Search ............................ 526/279; 525/479, 525/100, 106, 437

[56] References Cited

U.S. PATENT DOCUMENTS

| | | | |
|---|---|---|---|
| 5,061,481 | 10/1991 | Suzuki et al. | 424/63 |
| 5,166,276 | 11/1992 | Hayama et al. | 526/279 |
| 5,219,560 | 6/1993 | Suzuki et al. | 526/279 |
| 5,256,739 | 10/1993 | Ono et al. | 526/279 |

*Primary Examiner*—Melvyn I. Marquis
*Attorney, Agent, or Firm*—Millen, White, Zelano & Branigan

[57] ABSTRACT

Disclosed is an electrophotographic toner binder which comprises a silicone-grafted copolymer produced by radical copolymerization of an organopolysiloxane compound represented by the following general formula (I) and another monomer capable of undergoing the radical copolymerization with said organopolysiloxane compound:

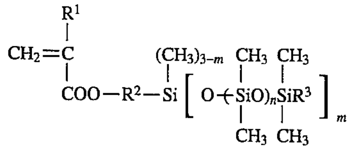

(I)

wherein $R^1$ represents a hydrogen atom or a methyl group; $R^2$ represents a divalent hydrocarbon group containing 1 to 12 carbon atoms, which may have one or more of an oxygen atom interposed in its carbon chain; $R^3$ represents a monovalent hydrocarbon group containing 1 to 6 carbon atoms; m represents 1, 2 or 3; and n represents an integer from 20 to 200.

6 Claims, No Drawings

BINDER FOR ELECTROPHOTOGRAPHIC TONER

FIELD OF THE INVENTION

The present invention relates to a binder of dry toner used for development of electrostatic or magnetic images and, more particularly, to a dry toner binder which can ensure the toner excellent high-speed fixability and easy release from rubber rolls.

BACKGROUND OF THE INVENTION

One-component or two-component toner used in a dry development system is constituted of a binding resin, a coloring agent, a charge controlling agent and so on. Since the binding resin is a main component of the toner in the above case, characteristics such as grindability, the capacity to disperse a coloring agent and so on are required of the binder. Further, it becomes necessary for the binding resin to have many other properties including fixability, anti-offset and anti-blocking properties, electric properties and so on when the binding resin is mixed with other constituents inside the toner.

In particular, the fixation has been in need of speeding-up with an increase in developing speed. Such being the case, certain binding resins capable of ensuring easy release of toner from rolls and various types of internal mold-releasing agents have been proposed. For instance, Japanese Tokkai Hei 5-197202 (the term "Tokkai" as used herein means an "unexamined published application") proposes the block copolymer of dimethylpolysiloxane and an aromatic polyester. This block copolymer can produce a marked improvement in anti-blocking property in fact, but it requires a high temperature and a long time for the polyesterification reaction. Thus, it is undesirable from an industrial point of view. Accordingly, it has been tried to use catalysts for the acceleration of polyester condensation, such as organotin compounds, in order to proceed the polyesterification reaction at a low temperature. However, it cannot be said that those tin compounds are not detrimental to health.

As the internal mold-releasing agent, on the other hand, there have been proposed liquids of the kind which have low surface energy, such as dimethylsilicone oil (U.S. Pat. No. 4,517,272). However, it has been pointed out that the silicone oil soiled the carrier particles. After the soiling with silicone oil, the developer comes to be short of triboelectricity, and so it becomes difficult to consistently charge the toner.

As a result of our intensive studies for solving the above-described problems, it has been found out that dimethylsiloxane-grafted acrylate copolymers are suitable for a binder of toner in view of not only their physical properties but also easiness of production, thereby achieving the present invention.

SUMMARY OF THE INVENTION

Therefore, an object of the present invention is to provide a binding resin which has excellent properties as a binder for electrophotographic toner and can be produced will ease.

The above-described object of the present invention is attained with a binder for electrophotographic toner, comprising a copolymer produced by radical copolymerization of an organopolysiloxane compound represented by the following general formula (I) and another monomer capable of undergoing the radical copolymerization with the organopolysiloxane compound:

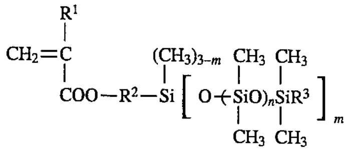
(I)

wherein $R^1$ represents a hydrogen atom or a methyl group; $R^2$ represents a divalent hydrocarbon group containing 1 to 12 carbon atoms, which may have one or more of an oxygen atom interposed in its carbon chain; $R^3$ represents a monovalent hydrocarbon group containing 1 to 6 carbon atoms; m represents 1, 2 or 3; and n represents an integer from 20 to 200.

The toner containing a binder according to the present invention does not cause aggregation upon storage, and so it can retain excellent flowability. More specifically, the present binder can ensure good slippage among toner particles, little influence of the surrounding moisture and temperature upon the toner, and remarkably high releasability of the toner from rubber rolls used for toner fixation. Thus, the resulting toner can form clear images even with a high-speed machine.

DETAILED DESCRIPTION OF THE INVENTION

The detailed description begins with an organopolysiloxane compound represented by general formula (I), called hereinafter a radical polymerizable silicone macromonomer.

The radical polymerizable silicone macromonomer can be obtained by carrying out a conventional dehydrochlorination reaction between a (meth)acrylate-substituted chlorosilane compound represented by the following general formula (II) and a terminal hydroxy group-containing dimethylpolysiloxane confound represented by the following general formula (III), or by causing a conventional reaction for eliminating lithium chloride between the compound represented by formula (II) and a terminal Li-containing dimethylpolysiloxane compound represented by the following general formula (IV):

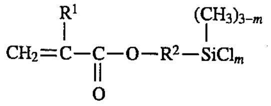
(II)

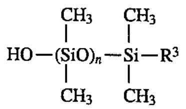
(III)

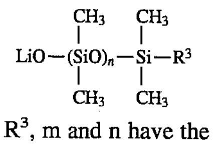
(IV)

wherein $R^1$, $R^2$, $R^3$, m and n have the same meanings as in general formula (I), respectively.

Also, the foregoing radical polymerizable silicone macromonomer can be obtained by the addition reaction between an organohydrogenpolysiloxane containing one Si—H bonding in a side chain and an allyl(meth)acrylate in the presence of a Pt catalyst. However, the preparation method for the present silicone macromonomers should not be construed as being limited to the above-cited ones.

In general formula (I) illustrated above, it is preferably that $R^2$ be $—CH_2—$, $—(CH_2)_3—$ or $—(CH_2)_2—O—(CH_2)_3—$, $R^3$ be a methyl or n-butyl group, and n be an integer of from 24 to 100.

Specific examples of the radical polymerizable silicone macromonomer of general formula (I) are illustrated below.

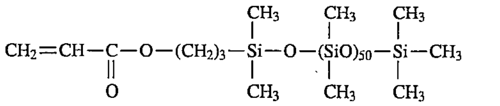

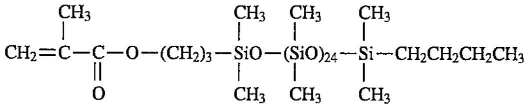

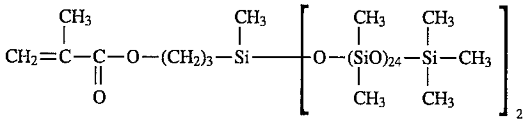

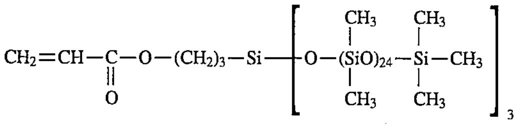

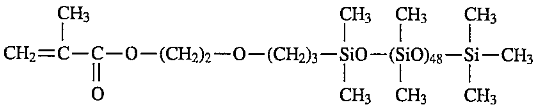

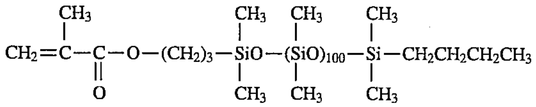

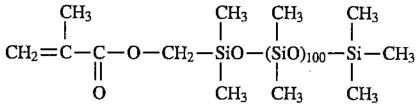

As for the radical polymerizable monomer which can copolymerize with the foregoing organopolysiloxane compounds, it may be constituted of one or more of a monomer chosen from acrylate derivatives, methacrylate derivatives and styrene derivatives.

Specific examples of such monomers include alkyl(meth)acrylates such as methyl(meth)acrylate, ethyl(meth)acrylate, n-butyl(meth)acrylate, 2-ethylhexyl(meth)acrylate, etc.; hydroxyalkyl(meth)acrylates such as 2-hydroxyethyl(meth)acrylate, 2-hydroxypropyl(meth)acrylate, 2-hydroxybutyl(meth)acrylate, etc.; fluorine-substituted alkyl(meth)acrylates such as trifluoropropyl(meth)acrylate, perfluorobutylethyl(meth)acrylate, perfluorooctylethyl(meth)acrylate, etc.; epoxy group-containing (meth)acrylates such as glycidyl(meth)acrylate, 3,4-epoxycyclohexylmethyl(meth)acrylate, etc.; and styrenes such as styrene, α-methylstyrene, 4-methylstyrene, 3-methylstyrene, 4-vinylanisole, 2-chlorostyrene, 3-chlorostyrene, 4-chlorostyrene, etc.

Other radical polymerizable monomers may be used in copolymerizing the above-cited monomers and the present silicone macromonomer so far as they don't impair the features of the present invention. Specific examples of such monomers include acids such as maleic acid, fumaric acid, acrylic acid, methacrylic acid, etc., amides such as acrylamide, N-methylol alkylamides, etc., radical polymerizable silane compounds such as 3-trimethoxysilylpropyl(meth)acrylate, 3-triethoxysilyl(meth)acrylate, 3-dimethoxymethylsilylpropyl(meth)acrylate, vinyltriethoxysilane, 4-vinylphenyltrimethoxysilane, vinylmethyldimethoxysilane; 4-trimethoxysilyl-1-butene, 6-trimethoxysilyl-1-hexene, etc., acrylonitrile, vinylpyridine, vinylpyrrolidone, vinyl acetate, vinyl alkyl ethers, and radical polymerizable macromonomers such as polyoxyalkylenes and polycaprolactones which each contain one radical polymerizable group.

A suitable compounding ratio of the radical polymerizable silicone macromonomers to the radical polymerizable monomers in the present silicone-grafted copolymer ranges from 5/95 to 80/20 by weight. When the proportion of the radical polymerizable silicone macromonomers is increased beyond 80% by weight, the resulting copolymer cannot provide sufficient fixability; while when it is less than 5% by weight, the mold-releasing property can hardly be expected from the resulting copolymer.

The copolymerization reaction for producing the radical polymerizable silicone macromonomers is carried out in the presence of a conventional radical polymerization initiator. Suitable examples of such an initiator include organic peroxides, such as benzoyl peroxide, dicumyl peroxide, lauroyl peroxide, etc., and azo compounds such as 2,2'-azobis-(2-methylbutyronitrile), 2,2-azobisisobutyronitrile, etc. Therein, both a solution polymerization method and a bulk polymerization method can be adopted.

In the foregoing copolymerization reaction, a chain-transfer agent such as butyl mercaptane, dodecyl mercaptane, 3-mercaptopropyltrimethoxysilane, carbon tetrachloride, α-methylstyrene dimer or so on may be used for the purpose of controlling the molecular weight.

As for the solvent used in producing the present silicone macromonomers according to the solution polymerization method, aromatic hydrocarbons such as benzene, toluene, xylene, etc., ketones such as acetone, methyl ethyl ketone, methyl isobutyl ketone, etc., esters such as ethyl acetate, n-butyl acetate, isobutyl acetate, etc., and alcohols such as ethanol, isopropanol, n-butanol, isobutanol, etc. are examples thereof. These solvents can be used alone or as a mixture of two or more thereof.

A suitable temperature for the polymerization reaction ranges from 50° to 180° C., and it is particularly preferable to carry out the reaction in the temperature range of 60° to 120°C. Under these temperatures, the polymerization reaction can be completed in a period from about 5 to about 10 hours. It is desirable that the thus produced silicone-grafter copolymer have its weight average molecular weight in the range of 5,000 to 500,000, particularly 10,000 to 100,000, reduced to a polystyrene basis according to the measurement by GPC. When the copolymer has a weight average molecular weight less than 5,000, the resulting toner cannot acquire sufficient image-forming capability; while it has a weight average molecular weight greater than 500,000, other thermoplastic resins cannot be dispersed thereinto to a satisfactory extent, thereby causing a drop in image sharpness.

Also, the present silicone-grafted copolymers can be produced by carrying out suspension polymerization in an aqueous medium, or using an emulsion polymerization method in which the constituent monomers are first emulsified in the presence of a surfactant and then undergo radical polymerization.

The emulsion polymerization may be carried out, e.g., in the following manner: A mixture of the radical polymerizable silicone macromonomer with other radical polymerizable monomers is admixed with a surfactant, dispersed into an aqueous medium in the form of emulsion, and then subjected to emulsion polymerization in the presence of a water-soluble radical polymerization initiator. Suitable examples of a surfactant which can be used therein include alkylbenzenesulfonates such as sodium dodecylbenzenesulfonate, etc., alkylnaphthalenesulfonates, alkylaryl ethers of polyoxyethylene sulfonic acid monoester sodium, sodium laurylsulfate and so on; while examples of a water-soluble radical polymerization initiator usable therein include inorganic peroxides such as potassium persulfate, sodium persulfate, etc., organic peroxides such as t-butylperoxymaleic acid, succinic acid peroxide, t-butylhydroperoxide, etc., and azobis compounds such as 2,2'-azobis-(2-N-benzylamidino-)propane hydrochloride, 2,2'-azobis-[2-(N-2-hydroxyethyl)amidino]propane, 2,2'-azobis-(2-methyl-N-hydroxyethyl-)propionamide, etc.

The silicone-grafted copolymers produced using the solution or emulsion polymerization method as described above are isolated from the dispersion medium by a conventional operation, e.g., spray drying, vacuum condensation or so on, and further ground, if needed. Thus, granulated copolymers are obtained.

In view of consistent electrification of toner, the present copolymers can be admixed with thermoplastic resins which have so far been used as binder. Thermoplastic resins suitable for this case are resins having a glass transition point ranging from 40° to 120° C., particularly from 50° to 100° C. Specific examples of such resins include a polystyrene resin, an epoxy resin, a terpene resin, a polyester resin, an acrylic resin, a styrene-acrylate copolymer resin, a styrene-acrylonitrile copolymer resin and so on.

When the thermoplastic resin mixed has a glass transition point higher than 120° C., the resulting toner requires a high temperature for fixation, and so it is unsuitable for high-speed fixation. When the glass transition point of the thermoplastic resin mixed is lower than 40° C., on the other hand, the resulting toner is subject to blocking and, what is worse, sometimes suffers from poor flowability in summer. As for the amount of the thermoplastic resin used, it is effective in the range of 0 to 500 parts by weight, particularly 0 to 300 parts by weight, per 100 parts by weight of silicone-grafted copolymer. When the thermoplastic resin is mixed in an amount larger than 500 parts by weight, the resulting toner is poor in releasability from rolls. Therefore, mixing in such a large amount mars the advantage derived from the present silicone-grafted copolymers.

Toner can be prepared by preliminarily mixing a silicone-grafted copolymer according to the present invention with a thermoplastic resin as cited above, if desired, a coloring agent such as carbon black, dyes, etc., a charge controlling agent such as a phosphate, a chromium complex compound, etc., and a dispersing aid such as silica, etc., melting the mixture by heating with an internal mixer, a roll or the like, and then grinding it into fine powder by means of a jet mill or the like. The present invention does not have any particular restriction as to the mixing method, provided that the method can achieve homogeneous dispersion and pulverization of the 5–30μm order.

Now, the present invention is illustrated in greater detail by reference to the following examples. However, the invention should not be construed as being limited to these examples. Additionally, all parts in the following description are by weight.

Synthesis Example 1: Synthesis of Grafted Copolymer (1) According to Present Invention A mixture of 30 parts of the macromonomer of formula (i) illustrated below, 70 parts of methylmethacrylate and 2 parts of azobisisobutyronitrile was added dropwise to 100 parts of toluene over a period of 2 hours at 80–90° C. under an atmosphere of $N_2$.

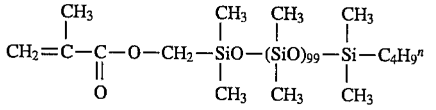

(i)

After the conclusion of the dropwise addition, the reaction mixture was ripened for 8 hours at 80°–90° C. Then, the toluene was distilled away under reduced pressure, and the silicone-modified resin obtained was ground into a powder with a hammer mill. Thus, a grafted copolymer according to the present invention [Grafted Copolymer (1)]was pro&iced, which had a weight average molecular weight of 35,000.

Synthesis Example 2: Synthesis of Grafted Copolymer (2) According to Present Invention A mixture of 30 parts of the macromonomer of formula (ii) illustrated below, 50 parts of styrene, 20 parts of butylmethacrylate and 2 parts of azobisisobutyronitrile was added dropwise to 100 parts of toluene over a period of 2 hours at 80°–90° C. under an atmosphere of $N_2$.

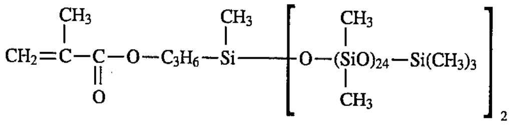

(ii)

After the conclusion of the dropwise addition, the reaction mixture was ripened for 8 hours at 80°–90° C. Then, the toluene was distilled away under reduced pressure, and the silicone-modified resin obtained was ground into a powder with a hammer mill. Thus, another grafted copolymer according to the present invention [Grafted Copolymer (2)] was produced, which had a weight average molecular weight of 43,000 was produced.

Synthesis Example 3: Synthesis of Grafted Copolymer (3) Which is Out of Scope of Present Invention A Grafted Copolymer (3) having a molecular weight of 31,000, which was out of the scope of the present invention, was produced in the same manner as in Synthesis Example 1, except that the compound of formula (iii) illustrated below was used in place of the macromonomer used in Synthesis Example 1.

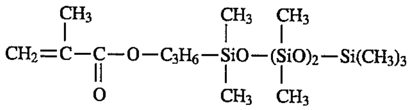

(iii)

EXAMPLE 1

Fifty parts of Grafted Copolymer (1), 50 parts of a styreneacrylate resin having a glass transition point of 63° C. (Himer TB-9000, trade namer products of Sanyo Chemical Industries Co., Ltd.), 5 parts of carbon black (MA-600, products of Mitsubishi Chemical Industries Ltd.) and 1 part of methyltriphenylphosphonium tosylate as a charge controlling agent were mixed and dispersed at 160° C. by means of hot rolls, then ground with a hammer mill, and further pulverized with a jet mill. Thus, a fine toner powder having an average particle size of about 20 μm was obtained.

A developer was prepared using a ferrite carrier having an average particle size of 150 μm (produced by Powder Tec Co., Ltd.) and the foregoing toner in such amounts that the toner concentration might be adjusted to 0.5 % by weight, and put to the test with a copying machine of magnetic brush development-adopted two-component dry system (copying speed: 60 sheets/minute).

After the copying operation was repeated 50,000 times, the copy obtained last was examined for fog. Therein, a clear image was found to be formed and no fog was observed. In addition, the fixing rolls were free from soiling due to the adhesion of toner thereto. Further, this developer retained its flowability even after 24 hours' standing under exposure to the air of 50° C.- 98% RH.

EXAMPLE 2

Another fine toner powder was prepared in the same manner as in Example 1, except that Grafted Copolymer (2) was used in place of Grafted Copolymer (1), and evaluated by the same procedure as in Example 1. As a result of it, no fog nor roll soiling were observed, and the developer showed good flowability.

COMPARATIVE EXAMPLE 1

Still another fine toner powder was prepared in the same manner as in Example 1, except that Grafted Copolymer (3) was used in place of Grafted Copolymer (1), and evaluated by the same procedure as in Example 1. As a result of it, no fog was observed and the developer Showed good flowability. However, the rolls had slight soiling.

COMPARATIVE EXAMPLE 2

The other fine toner powder was prepared in the same manner as in Example 1, except that all the binding resin component, namely 50 parts of Grafted Copolymer (1) and 50 parts of the styrene-acrylate copolymer resin having a glass transition point of 63° C. , was replaced by 100 parts of the foregoing styrene-acrylate copolymer resin, and evaluated by the same procedure as in Example 1. At the point of time when 10,000 times of copying operations were finished, however, fog generation and the roll soiling were already observed. In addition, the toner showed a fair extent of drop in flowability.

What is claimed is:

1. A binder for electrophotographic toner, comprising (A) and (B) in which (A) is a copolymer produced by radical copolymerization of an organopolysiloxane compound represented by the following general formula (I) and another monomer capable of undergoing the radical copolymerization with said organopolysiloxane compound:

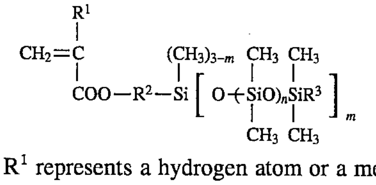

(I)

wherein $R^1$ represents a hydrogen atom or a methyl group; $R^2$ represents a divalent hydrocarbon group containing 1 to 12 carbon atoms, which may have one or more of an oxygen atom interposed in its carbon chain; $R^3$ represents a monovalent hydrocarbon group containing 1 to 6 carbon atoms; m represents 1, 2 or 3; and n represents an integer from 20 to 200; and (B) is an organopolysiloxane-free thermoplastic resin having a glass transition point of from 40° to 120° C. in an mount up to 500 pans by weight to 100 parts by weight of said copolymer.

2. A binder for electrophotographic toner as claimed in claim 1, wherein the organopolysiloxane compound and the other monomer are copolymerized in a ratio ranging from 5/95 to 80/20 by weight.

3. A binder for electrophotographic toner as claimed in claim 1, wherein the copolymer has an weight average molecular weight of from 5,000 to 500,000, reduced to a polystyrene basis according to the measurement by gel permeation chromatography.

4. A binder for electrophotographic toner as claimed in claim 1, wherein the organopolysiloxane compound is a compound represented by the formula (I) in which $R^2$ is an alkylene group containing 1 to 3 carbon atoms, $R^3$ is an alkyl group containing 1 to 4 carbon atoms and n is an integer from 24 to 100.

5. A binder for electrophotographic toner as claimed in claim 1, wherein the monomer capable of undergoing the radical copolymerization with the organopolysiloxane compound of general formula (2) is constituted of at least one compound selected from the group consisting of alkyl acrylates, hydroxy alkyl acrylates, fluorine-substituted alkyl acrylates, epoxy group-containing acrylates, alkylmethacrylates, hydroxyalkylmethacrylates, fluorine-substituted alkylmethacrylates, epoxy group-containing methacrylates and styrenes.

6. A binder for electrophotographic toner comprising (A) and (B) in which (A) is a copolymer produced by radical copolymerization of an organopolysiloxane compound represented by the following general formula (I) and another monomer capable of undergoing the radical copolymerization with said organopolysiloxane compound:

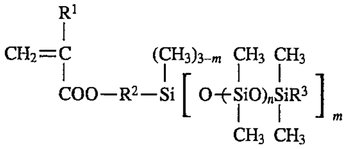

(I)

wherein $R^1$ represents a hydrogen atom or a methyl group; $R^2$ represents a divalent hydrocarbon group containing 1 to 12 carbon atoms, which may, have one or more of an oxygen atom interposed in its carbon chain; $R^3$ represents a monovalent hydrocarbon group containing 1 to 6 carbon atoms; m represents 1, 2 or 3; and n represents an integer from 20 to 200; and (B) is an organopolysiloxane-free thermoplastic resin having a glass transition point of from 40° to 120° C., wherein the organopolysiloxane-free thermoplastic resin is present in an amount of about 50 parts by weight to 100 parts by weight of said copolymer.

* * * * *